(12) United States Patent
Chang

(10) Patent No.: US 10,496,875 B1
(45) Date of Patent: *Dec. 3, 2019

(54) DETERMINING A MOOD FOR A GROUP

(71) Applicant: Snap Inc., Venice, CA (US)

(72) Inventor: Sheldon Chang, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,870

(22) Filed: Jul. 17, 2018

Related U.S. Application Data

(63) Continuation of application No. 14/691,313, filed on Apr. 20, 2015, now Pat. No. 10,061,977.

(51) Int. Cl.
*G06K 9/62* (2006.01)
*G06K 9/00* (2006.01)

(52) U.S. Cl.
CPC ..... *G06K 9/00315* (2013.01); *G06K 9/00335* (2013.01); *G06F 2203/011* (2013.01)

(58) Field of Classification Search
CPC ............ G06K 9/00315; G06K 9/00335; G06F 2203/011
See application file for complete search history.

(56) References Cited

U.S. PATENT DOCUMENTS

| 6,038,295 | A | 3/2000 | Mattes |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,363,063 | B2 | 1/2013 | Qu et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |

(Continued)

FOREIGN PATENT DOCUMENTS

CA 2887596 A1 7/2015

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

*Primary Examiner* — Samir A Ahmed
(74) *Attorney, Agent, or Firm* — Schwegman Lundberg & Woessner, P.A.

(57) ABSTRACT

A system and method for determining a mood for a crowd is disclosed. In example embodiments, a method includes identifying an event that includes two or more attendees, receiving at least one indicator representing emotions of attendees, determining a numerical value for each of the indicators, and aggregating the numerical values to determine an aggregate mood of the attendees of the event.

20 Claims, 18 Drawing Sheets

(56) References Cited

U.S. PATENT DOCUMENTS

| | | |
|---|---|---|
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 10,061,977 B1* | 8/2018 | Chang ................ G06K 9/00315 |
| 2004/0022432 A1 | 2/2004 | Hayata et al. |
| 2005/0131744 A1 | 6/2005 | Brown et al. |
| 2006/0115157 A1 | 6/2006 | Mori et al. |
| 2007/0041644 A1 | 2/2007 | Kim et al. |
| 2008/0154883 A1* | 6/2008 | Chowdhury .......... G06F 3/0482 |
| 2009/0310828 A1 | 12/2009 | Kakadiaris et al. |
| 2009/0312998 A1 | 12/2009 | Berckmans et al. |
| 2010/0253689 A1 | 10/2010 | Dinicola et al. |
| 2011/0043602 A1 | 2/2011 | Lee |
| 2011/0158540 A1 | 6/2011 | Suzuki et al. |
| 2011/0202598 A1 | 8/2011 | Evans et al. |
| 2011/0295392 A1 | 12/2011 | Cunnington et al. |
| 2011/0309946 A1 | 12/2011 | Jonsson et al. |
| 2011/0311112 A1 | 12/2011 | Matsuyama et al. |
| 2012/0209924 A1 | 8/2012 | Evans et al. |
| 2012/0223952 A1* | 9/2012 | Kanemaru .............. G06T 13/40 345/473 |
| 2012/0278064 A1 | 11/2012 | Leary et al. |
| 2013/0019187 A1 | 1/2013 | Hind et al. |
| 2013/0038756 A1 | 2/2013 | Cheng |
| 2014/0002573 A1 | 1/2014 | Kim et al. |
| 2014/0101296 A1* | 4/2014 | Li ....................... H04L 41/0813 709/221 |
| 2014/0108309 A1* | 4/2014 | Frank ................... G06N 99/005 706/12 |
| 2014/0112556 A1* | 4/2014 | Kalinli-Akbacak .... G10L 25/63 382/128 |
| 2014/0280529 A1* | 9/2014 | Davis ..................... H04L 67/22 709/204 |
| 2016/0042226 A1* | 2/2016 | Cunico .................. H04N 7/147 382/103 |

\* cited by examiner

DETERMINING A MOOD FOR A GROUP

CROSS REFERENCE TO RELATED APPLICATIONS

This application is a continuation of and claims priority to U.S. patent application Ser. No. 14/691,313, filed Apr. 20, 2015 and entitled "DETERMINING A MOOD FOR A GROUP." The contents of this prior application are considered part of this application, and are hereby incorporated by reference in its entirety.

TECHNICAL FIELD

Embodiments of the present disclosure relate generally to mobile computing technology and, more particularly, but not by way of limitation, to determining a mood for a group of people.

BACKGROUND

Text messages and/or pictographs are a popular form of expression in digital communications. Users of various mobile computing devices frequently take pictures of themselves and their surroundings.

Technological advances in facial recognition allow an image processing system to determine an emotion of a user based on an image of the user's face. In some scenarios, an image processing system may be more sensitive than a human.

BRIEF DESCRIPTION OF THE DRAWINGS

Various ones of the appended drawings merely illustrate example embodiments of the present disclosure and should not be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general well-known instruction instances, protocols, structures, and techniques are not necessarily shown in detail.

In this disclosure, different systems and methods are described for determining a mood of a group of people using images from the people's mobile computing devices. Certain embodiments, for example, involve identifying an event that includes two or more attendees, and receiving at least one indicator representing emotions of attendees (e.g. images or text). A mood detection system of a device can then generate a numerical value for each of the indicators. Numerical values for different users at the event can be aggregated by the device to determine an aggregate mood of the attendees of the event.

In certain embodiments a social messaging application (e.g., SNAPCHAT®) executing on user's mobile computer devices that is designed to capture images taken by the device may be used with a mood detection system for determining a mood of a group. In a social messaging application, a user captures an image (e.g., a still image, animated image, video, or the like, via an image sensor of the user device) and composes a message using the social messaging application.

Because the nature of the social messaging application is to communicate using images, the messages passed between users of the social messaging application frequently include the user's face (e.g. "selfies", images with the user and friends, or the like). The images may also include faces of other individuals within view of the image sensor.

Figure 1:
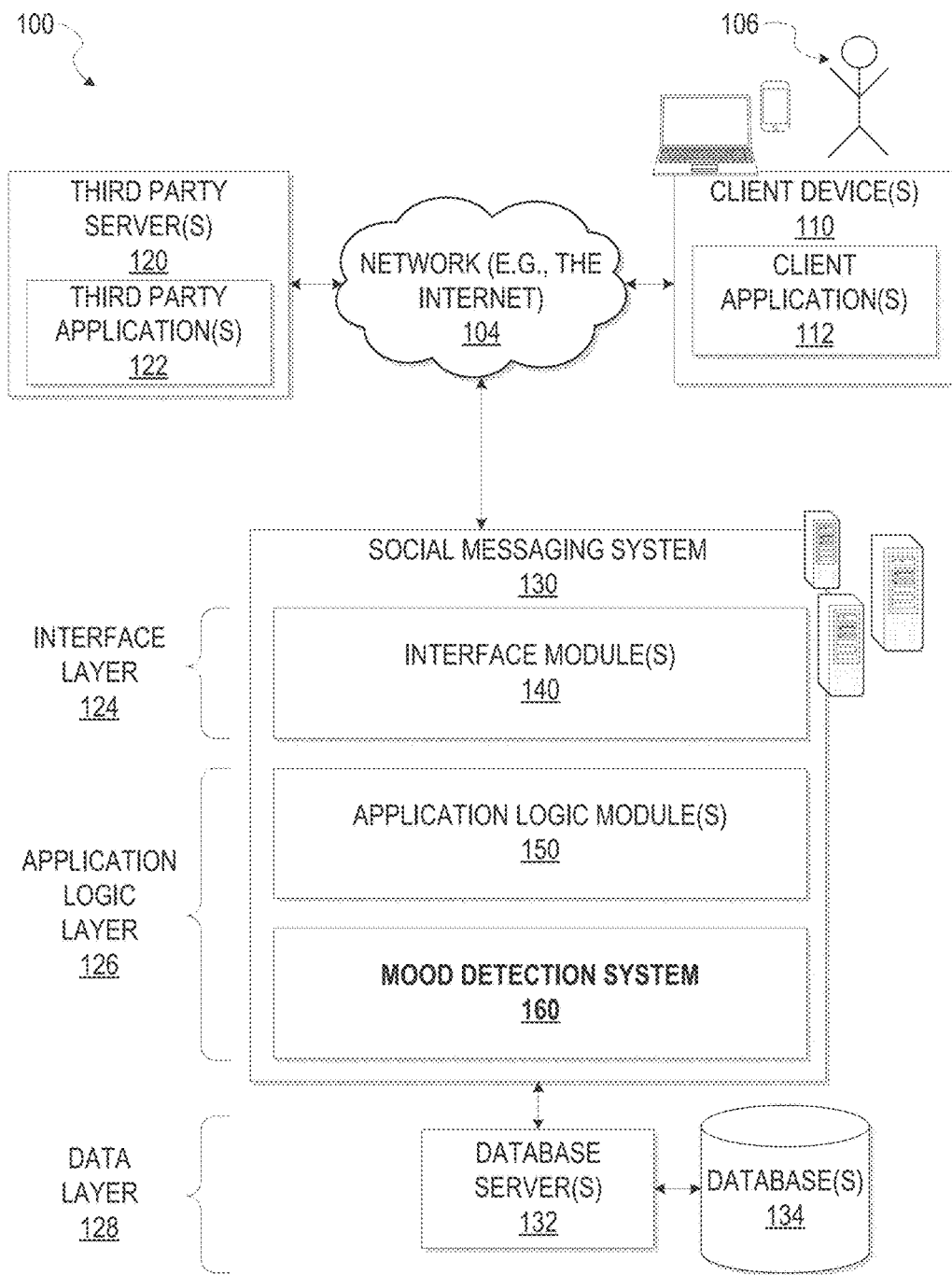
FIG. 1 is a block diagram illustrating a networked system, according to some example embodiments.

Furthermore, technical advances in facial recognition make it possible for a mood detection system such as mood detection system 160 of FIG. 1 to determine an emotion of a user using an image of the user's face. Such a mood detection system 160 may also determine a level of the emotion. For example, a happiness rating may be from 0 to 5 and the mood detection system 160 could determine that one user in an image has a happiness rating of 2 while another user in the image has a happiness rating of 4. Various embodiments are not limited in this regard and any scale of level of an emotion may be used.

In certain embodiments a mood detection system 160, as will be further described, determines an event where the users are located and assembles the messages that originate with users who are at the event. The mood detection system 160 analyzes the various faces in the images and aggregates the resulting emotions to determine an aggregate mood for the group of people. The mood detection system 160 further infers the mood for the entire group of people, but based on the images received from users in the group.

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and media communication, determining geolocation, etc.) and aspects associated with the network system 100 and its users. Although embodiments illustrated herein use a client-server architecture, other embodiments may include other network architectures, such as peer-to-peer or distributed network environments.

As shown in FIG. 1, the network system 100 may include a social messaging system 130. The social messaging system 130 is generally based on a three-tiered architecture, consisting of an interface layer 124, an application logic layer 126, and a data layer 128. Each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such architecture.

As shown in FIG. 1, the interface layer 124 consists of interface module(s) (e.g., a web server) 140, which receives requests from various client-computing devices and servers, such as client device(s) 110 executing client application(s) 112, and third party server(s) 120 executing third party application(s) 122. In response to received requests, the interface module(s) 140 communicates appropriate responses to requesting devices via a network 104. For example, the interface module(s) 140 can receive requests such as Hypertext Transfer Protocol (HTTP) requests, or other web-based. Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™. ANDROID™. WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. One or more user(s) 106 can be a person, a machine, or other means of interacting with the client device(s) 110. In some embodiments, the user(s) 106 interact with the social messaging system 130 via the client device(s) 110. The user(s) 106 may not be part of the networked environment, but may be associated with the client device(s) 110.

As shown in FIG. 1, the data layer 128 has one or more database server(s) 132 that facilitate access to one or more information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as images (including pictures and/or video). The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

The mood detection system 160, as will be further described, identifies an event that includes two or more attendees and receives one or more indicators representing emotions of attendees. The indicators may include images of attendees, textual descriptions, or the like. The mood detection system 160 then determines a numerical value for each of the indicators where the numerical value indicates an intensity of the emotion. The mood detection system 160 then aggregates the numerical values to determine an aggregate mood of the attendees of the event as will be further described. In other example embodiments, the mood detection system 160 generates charts or other graphical representations of the indicators, mood, sentiment, or other determined factors.

Figure 2:
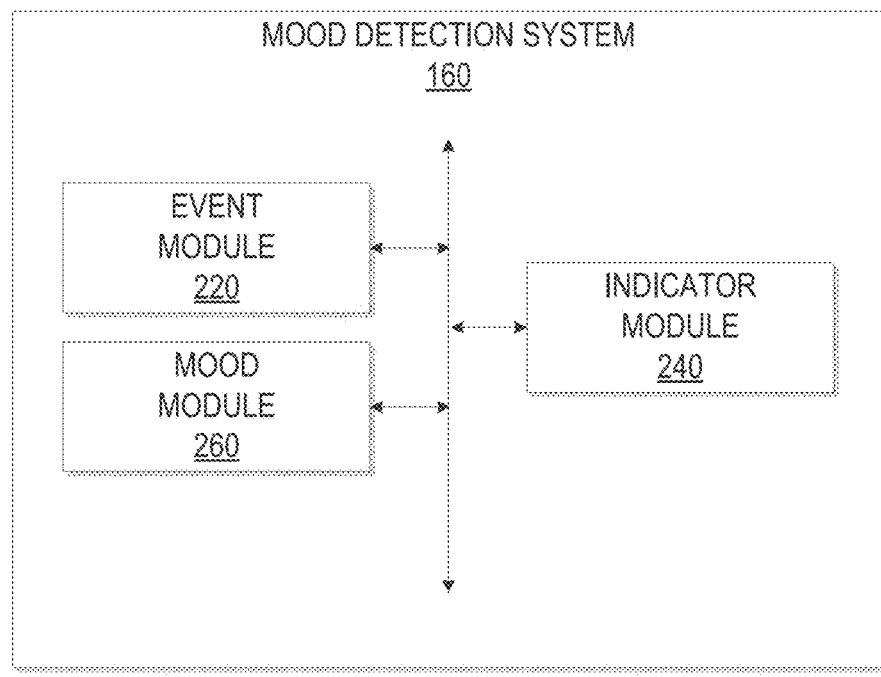
FIG. 2 is a block diagram illustrating one embodiment of a system, according to some example embodiments.

FIG. 2 is a block diagram 200 illustrating one embodiment of a mood detection system 160 according to some example embodiments. According to this embodiment, the mood detection system 160 includes an event module 220, an indicator module 240, and a mood module 260. As illustrated in FIG. 1, the social messaging system 130 includes a mood detection system 160. In various embodiments, the mood detection system 160 can be implemented as a standalone system and is not necessarily included in the social messaging system 130.

In various embodiments, some or all of the modules 220-260 communicate with each other, for example, via a network coupling, shared memory, or the like. Each module of modules 220-260 can be implemented as a single module, combined into other modules, or further subdivided into multiple modules. Other modules not pertinent to example embodiments can also be included, but are not shown.

In one embodiment, the event module 220 identifies an event that includes two or more attendees by receiving a request to monitor the event. In one example a host, producer, or other responsible entity transmits a request to monitor an event to the event module 220. Embodiments contemplate that the request could take any form. For example, the request could be made through an email or other communication, via a form-driven interface implemented for the receipt of such requests, a webpage accessible from a browser, a physical document, a phone call, proactively on the part of a system operator, etc. The request includes an event identifier, description, location, start time, duration, or other relevant information to identify the event. In response to receiving the request, the event module 220 identifies the event based on information included in the request.

In another embodiment, the event module 220 identifies an event by determining that a threshold number of users have transmitted messages from the location of the event. In one specific example, a threshold number of attendees is 20, and the event module 220 identifies an event based on more than 20 users transmitting messages through the social messaging system from the event.

The client device 110 can provide the geographic indication that includes a geo-identifier other than a particular geolocation. For example, the geographic indication can include a specified entity name (e.g., a business name), a specified geolocation type (e.g., a historical landmark, a soccer field, or an educational institution), or another geo-identifier operable to identify a particular geolocation.

The client device 110 provides location services functionality such as receiving or determining the current geolocation of the client device(s) 110 in real time. The client device(s) 110 include position components such as location sensors (e.g., a GPS receiver component), altitude sensors (e.g., altimeters or barometers that detect air pressure, from which altitude can be derived), orientation sensors (e.g., magnetometers that provide magnetic field strength along the x, y, and z axes), and the like. The position components can provide data such as latitude, longitude, altitude, and a time stamp at a regular update rate (e.g., a sampling rate). The geolocation module 166 receives, monitors, or otherwise obtains geolocation data from the position components of the client device(s) 110. In other embodiments, the geolocation module 166 obtains or derives geolocation data of the client device(s) 110 using other location services such as Internet Protocol (IP) geolocation, WI-FI® signal triangulation, BLUETOOTH® beacon signal detections that can indicate a particular location, and so forth.

The term "real-time data," as used herein, is intended to include data associated with an event currently happening. For example, the event module 220 receiving the current geolocation of the client device(s) 110 in real time includes a particular geolocation detected at the client device(s) 110 after a delay interval (e.g., due to transmission delay or other delays such as data being temporarily stored at an intermediate device). Thus, in some instances, receiving the current geolocation in real time is intended to include geolocations of the client device(s) 110 from the past. This discussion of real time applies equally throughout the specification in relation to other uses of the term "real time."

The event module 220 provides various data functionality such as exchanging information with databases or servers. For example, the event module 220 accesses member profiles of the social messaging system 130 that include profile data from the database(s) 134 (e.g., social graph data of the user that indicates contact members of the user on the social messaging system 130 or another social messaging service). In another example, the event module 220 stores a user preference, a user setting, or other user data in the databases(s) 134. In some embodiments, the event module 220 exchanges information with the third party server(s) 120, the client device(s) 110, or other sources of information. In one specific example, the event module 220 determines a location of a message received from a client device 110

In one embodiment, the event module 220 charges an event promoter, host, manager, or the like, according to a fee structure. In one example, the event module 220 identifies a fee to monitor an event in response to receiving a request to monitor crowd mood at the event. In another example embodiment, the event module 220 requests a fee to be paid by an event host, or the like, after determining an aggregate mood level for attendees at the event.

The event module 220 can allow for various fee structures to charge the third party entity in addition to those described above. For instance, the third party entity can be charged per location of use of the mood detection system 160, and/or for exclusive, or partially exclusive, use of the aggregate mood level.

In other embodiments, the event module 220 obtains or derives geolocation data of the client device 110 using other location services such as Internet Protocol (IP) geolocation, WI-FI® signal triangulation, BLUETOOTH® beacon signal detections that can indicate a particular location, and so forth. In an example, a particular merchant store employs a BLUETOOTH® beacon. When the BLUETOOTH® beacon is detected by the user device, an indication of the detection is communicated to the geolocation module 166. In this example, the geolocation of the BLUETOOTH® beacon is known or is accessible via a lookup of a beacon identifier included in the indication of the beacon detection. Based on the indication of the beacon detection and the beacon identifier, the event module 220 infers that the user device is within a communication distance (e.g., a short distance such as a communication range of approximately ten meters for class 2 BLUETOOTH®) of the BLUETOOTH® beacon. In this way, the event module 220 infers the current geolocation of the client device 110 based on detection of the BLUETOOTH® beacon. In a similar manner, the current geolocation of the client device 110 can be inferred from other signal detections originating from a known location (e.g., BLUETOOTH® detection of a peer device whose current geolocation can be ascertained or other near field communication (NFC) signal detections).

In one embodiment, the indicator module 240 receives indicators from attendees of the event. In one example, the indicators are images that include one or more faces of the attendees. In another example, the indicators are textual descriptions of emotions of the attendees. The indicator may also originate at a client device 110 for an attendee. For example, the client device 110 may analyze the image to determine a mood and a mood intensity of the attendee 106. The client device 110 then transmits the mood level (the mood and the intensity) of the attendee 106 to the indicator module 240.

In one embodiment, the emotion of the attendee 106 is selected from a set of predefined emotions. An emotion of an attendee 106 may include, but is not limited to, anger, fear, grief, joy, or other, or the like. In further examples, a level of the emotion may include a numeric value or textual description. A textual description may also be mapped to a predefined numeric value. For example, happiness may be defined in various levels, such as; glad (value=1), cheery (value=2), happy (value=3), ecstatic (value=4), overjoyed (value=5). Of course, other levels and/or descriptions may be used and this disclosure is not limited in this regard. Furthermore, other emotions may be defined that may not map to a textual description in the English language and an emotion may also be mapped to other emotions using terms in other languages, or the like.

In one embodiment, the mood module 260 determines a numeric value for each of the indicators. The numeric value may be according to a predefined value. For example, where the attendee describes his/her mood as "ecstatic," the mood module 260 may lookup "ecstatic" in a list of predefined moods and determine that the numeric value of the attendee's 106 emotion is 4 as previously described.

In one embodiment, the mood module 260 determines a numeric value for each of the indicators received by the indicator module 240. The numeric value for each indicator indicates an intensity of the emotion of the attendee 106. In one example, each emotion may have a scale from 0 to 5. Of course, this disclosure is not limited in this regard. Further, more specific examples of various emotional ranges are described in FIG. 5.

In another embodiment, the indicators are images of an attendee's face. The mood module 260 determines a mood for each of the faces in the image and also determines a numeric level for the mood. Initially, the mood module 260 isolates each face in the image. The mood module 260 then identifies one or more regions for each face and adds points to each region. The points define regions of each face, such as, but not limited to, a mouth, a nose, eyes, eyebrows, and other facial features.

As one skilled in the art may appreciate, points that define some regions will move more than points around other regions. For example, points that define a region for the mouth move more than points that define a region for a nose. Therefore, the mood module 260 uses points that move little (e.g. points for the nose) as a point of reference to determine how much other points move (e.g. points around the eyes) as the attendee expresses certain emotions.

In certain example embodiments, the mood module 260 further determines emotions of an attendee based on a distribution of points for the attendee's face. In one example, the distribution of points indicates locations of wrinkles around the eyes, a furrow of an eyebrow, or other locations of facial components.

In another embodiment, the mood module 260 compares the distribution of points for an attendee's face with a database of facial expressions. The database server (e.g. server 132 of FIG. 1), may store many sets of data for point distributions representing a large population of people and their facial expressions. For example, the database (FIG. 1: 134) stores data records for distributions of data points for various facial expressions as described herein.

In certain examples, an emotion of happy is indicated by raised corners of the mouth. In other examples, sadness is indicated by lowered corners of the mouth, lowered eyebrows, or the like as indicated by a data model. Furthermore, a magnitude of the emotion may be indicated by the locations of the points. Therefore, a bigger smile indicates more happiness. Being frightened is indicated by an open mouth and wide open eyes. Of course, as data models evolve over time, many other emotions may be determined based on facial expressions, data regions on a face, or the like as described herein. In one embodiment, the facial expressions may be encoded according to a standard coding system for facial actions and/or expressions. Of course, this disclosure is not limited in this regard.

In another embodiment, the mood module 260 further considers data received from other biometric sensors (FIG. 18: 1856) to determine an emotion for an attendee. For example, a biosignal biorhythm, or the like, may indicate a raised heart rate, other increased electrical signals, or the like and indicates heightened emotional experience which raises the mood level for the attendee. Of course, one skilled in the art may recognize other ways in which a biometric sensor may indicate an emotion or mood by an attendee and this disclosure is meant to include all such ways.

In one embodiment, the mood module 260 determines a most popular mood level indicated by the attendees and returns the mood level as an aggregated mood level. For example, where 5 attendees indicate a happiness level of 3, and 2 indicate a happiness level of 2, the mood module 280 determines that the aggregate mood level for the attendees is happiness level 3 because more people have a happiness level of 3 than other happiness levels.

In another embodiment, the mood module 260 determines an aggregated mood level by taking an average of the numerical values indicated by the indicators received by the indicator module 240. For example, where 10 attendees indicate respective mood levels of 3, 3, 4, 5, 5, 6, 7, 7, 7, and 9, the mood module 260 determines that the aggregate mood level for the attendees is 5.6. Of course, one skilled in the art may apply other statistical models to determine an aggregate value representing a set of other values and this disclosure is not limited in this regard.

Figure 5:
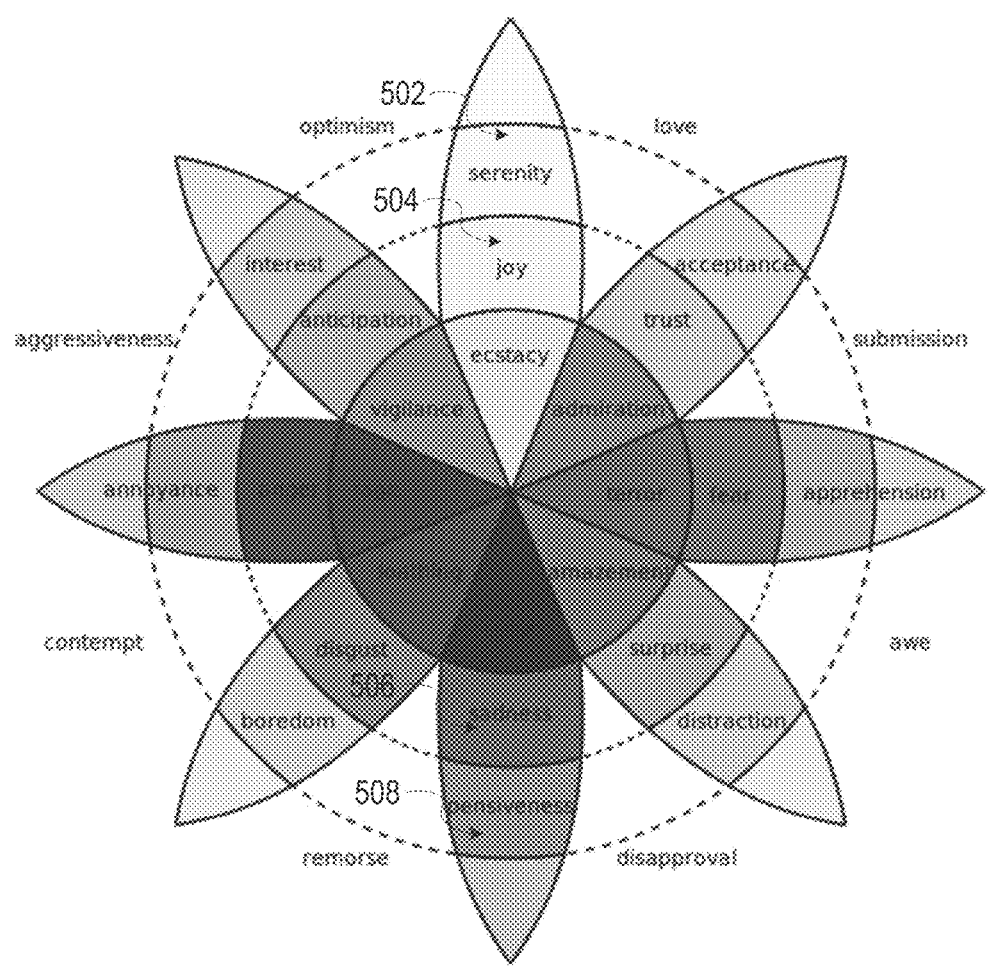
FIG. 5 is a chart illustrating one example of a model of human emotions, according to one example embodiment.

In one embodiment, the determined emotions are according to a model of emotions. In one example, a model of emotions is according to Robert Plutchhik's theory as depicted in FIG. 5 and as one skilled in the art may appreciate. Of course, other emotional models may be used and this disclosure is not limited in this regard. Emotional models and their application to this disclosure are further described regarding FIG. 5.

Figure 3:
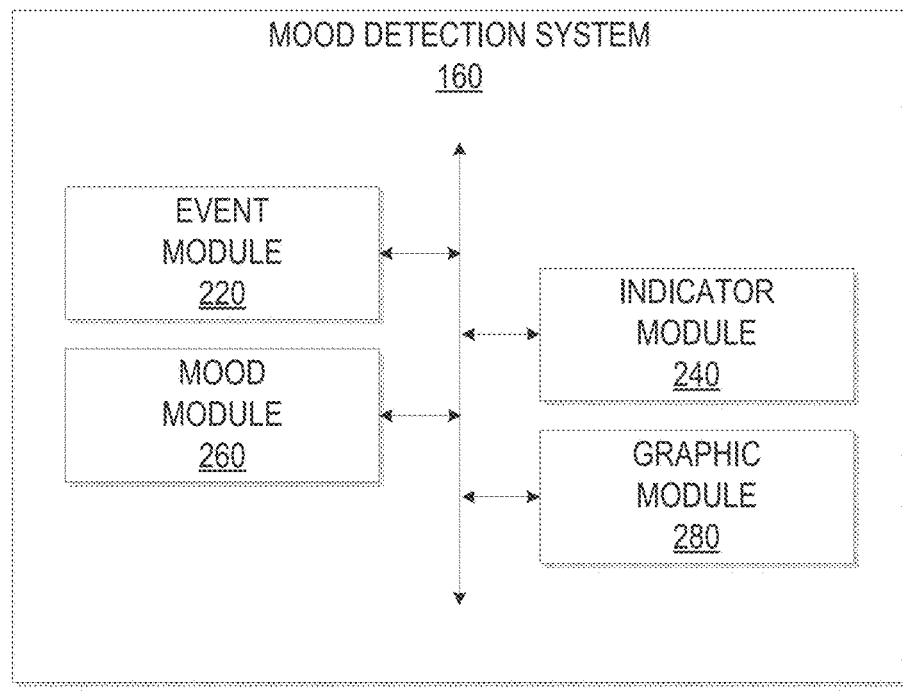
FIG. 3 is a block diagram illustrating one embodiment of a system, according to some example embodiments.

FIG. 3 is a block diagram illustrating one embodiment 300 of a system according to some example embodiments. In this example embodiment, the mood detection system 160 further includes a graphic module 280.

Figure 8:
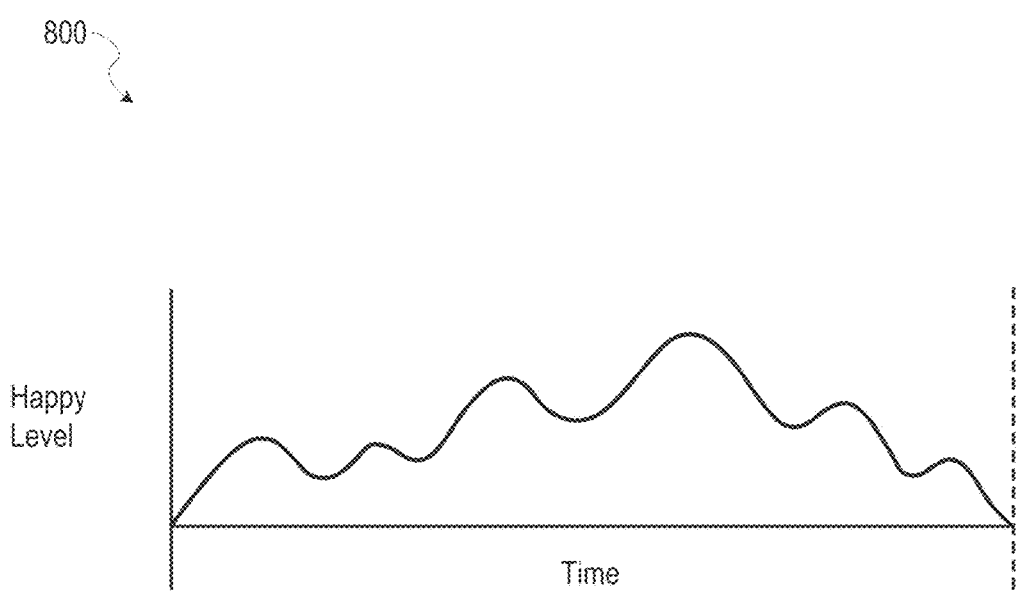
FIG. 8 is a chart illustrating one example of a mood of a group of people over time, according to one example embodiment.
Figure 9:
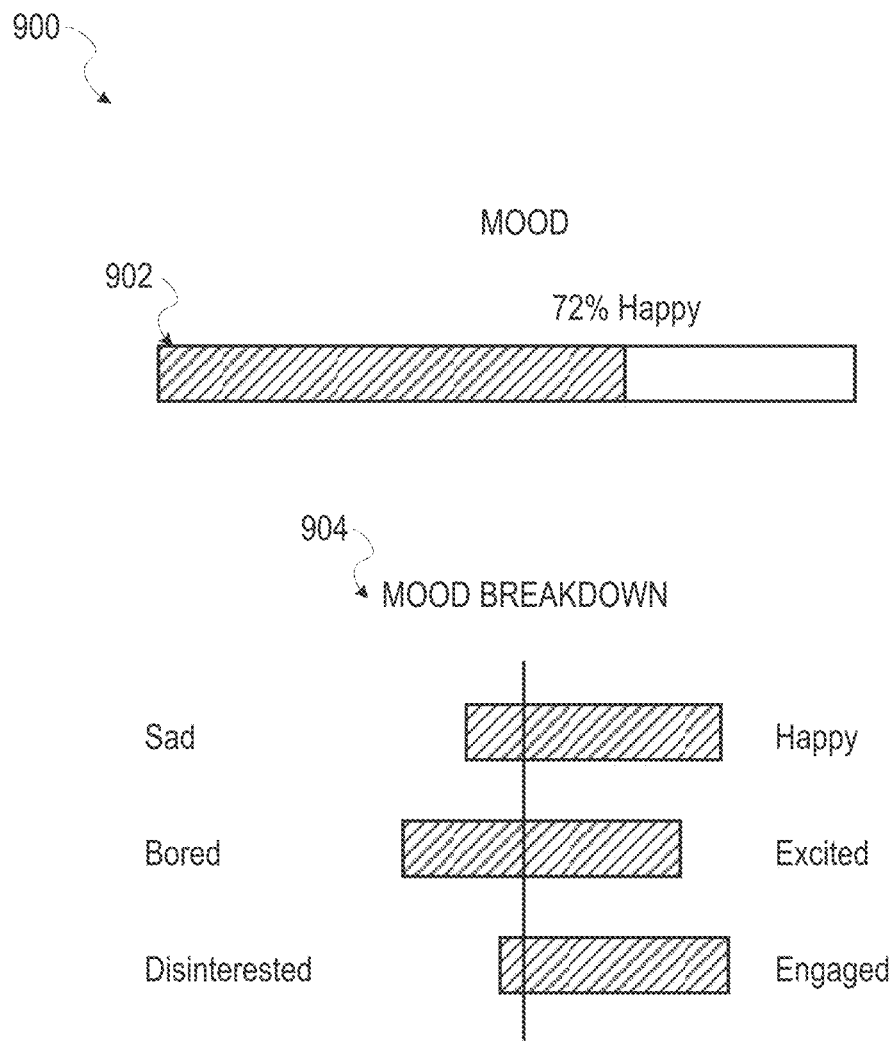
FIG. 9 is a chart illustrating one example of various emotions for a group of people according to one example embodiment.
Figure 10:
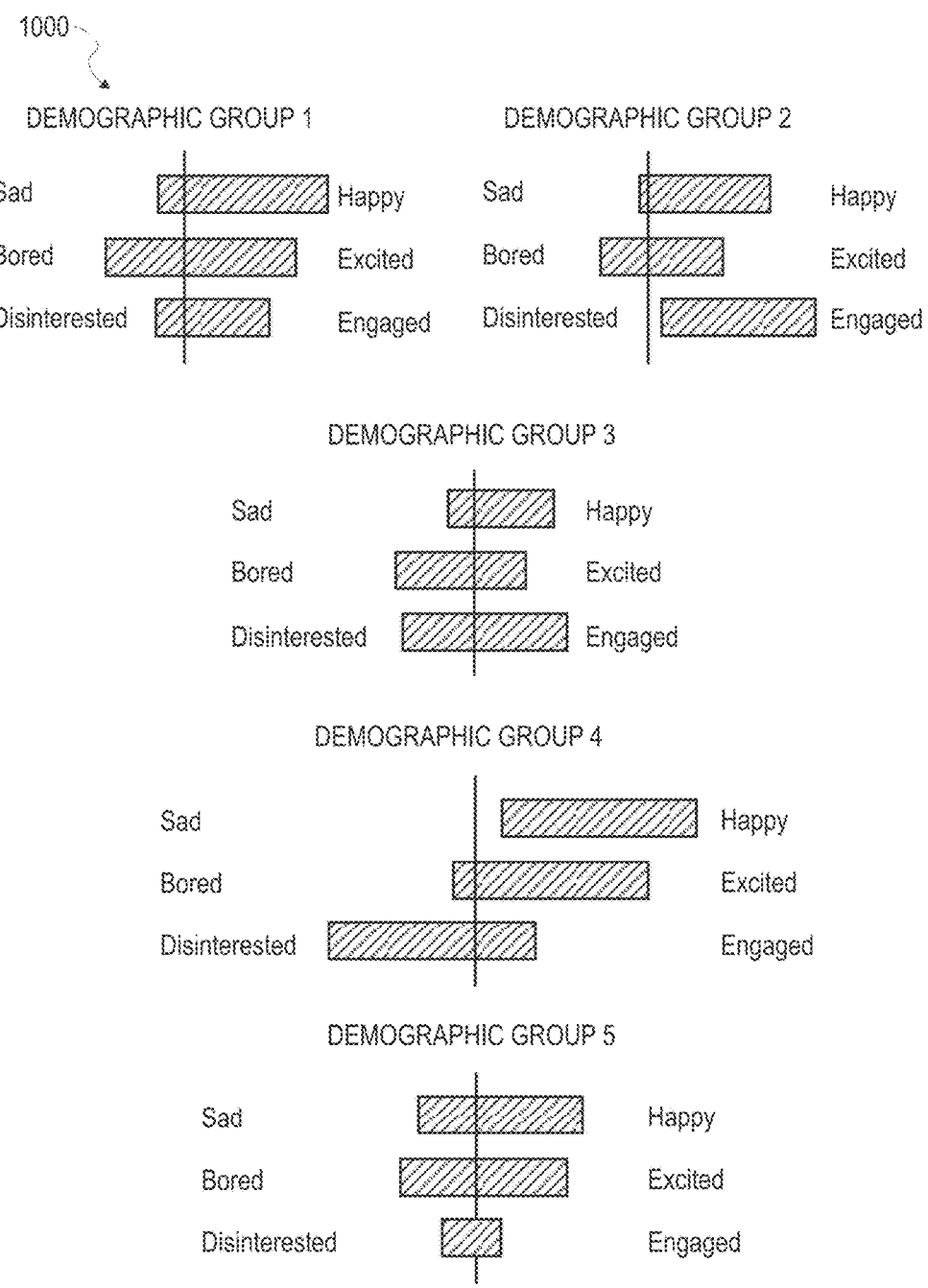
FIG. 10 is a set of charts illustrating one example of emotions for different groups of people according to one example embodiment.

In one embodiment, the graphic module 280 generates a chart to depict the emotions of the attendees. For example, the graphic module 280 generates a pictorial representation of an aggregate mood for the attendees. In another example, the graphic module 280 generates a chart that depicts each of the determined emotions of the attendees. In another example, the graphic module 280 generates a plot of an aggregate emotion over a period of time as depicted in FIG. 8. Specific examples of various charts, plots, and/or graphs are depicted in FIGS. 8-10.

Figure 4:
FIG. 4 is a diagram illustrating an example of a determining a mood for a group of attendees at an event, according to some example embodiments.

FIG. 4 is a diagram illustrating an example 400 of a group of attendees providing pictographs at an event, according to some example embodiments. FIG. 4 depicts a specific musical concert with many attendees. Certain attendees have respective client devices 110.

In this example, the attendees want to share the event with contacts (e.g., friends or followers) on the social messaging system 130. An attendee captures an image or video (e.g., via an image sensor of the client device) and composes a message using a social messaging application executing on the client device 110 (e.g., SNAPCHAT®).

The attendee can then cause transmission of the message, including the at least one selected pictograph, to one or more message recipients who can view the message and the at least one selected pictograph. In some embodiments, pictographs included in the message are image assets that are transmitted along with contents of the message. In other embodiments, the pictograph included in the message is a character code that a recipient device uses to identify the pictograph included in the message when the message is received (e.g., the pictograph is stored on the client device 110 prior to receipt of the message or is accessible to the recipient device upon receipt of the message).

In one embodiment, prior to the time of the event, the event module 220 received a request to monitor this event. In response, the event module 220 receives the pictographs (e.g. by way of the social messaging system 130) from the attendees and determines whether the pictographs were taken at the location of the event as previously described.

In one embodiment, the event module 220 forwards the pictographs that were taken at the location to the indicator module 240. The indicator module 240 then analyzes each of the pictographs, determines faces therein as previously described, and determines a mood level for each of the faces. The mood module 260 then aggregates the numerical values for each mood level to determine an aggregate sentiment for the attendees of the event.

In another embodiment, the event module 220 determines that a threshold number of people have transmitted messages to the mood detection system 160 from a specific location. In one example a threshold number of messages is 100. According to this embodiment, the event module 220 identifies a location and/or an event based on receiving more than 100 messages from client devices 110 operating at the location. Of course, other values may be used and this disclosure is not limited in this regard.

In another embodiment, client devices 110 within a threshold distance of the location are included in a list of client devices at the location. For example, a threshold distance is 100 meters and messages received from client devices 110 of the social messaging system 130 that are within 100 meters of the location are included in a list of client devices 110 at the location.

In one example embodiment, the mood module 260 transmits the aggregate mood level to a host for the event. Of course, the mood module 260 may also include any and/or all graphical representation of the mood level as generated by the graphic module 280, or the like, and this disclosure is not limited in this regard.

FIG. 5 is a chart illustrating one example 500 of a model of human emotions. FIG. 5 illustrates a specific emotional model for identifying emotions and their respective interrelations. For example, as depicted in FIG. 5, more intense emotions are closer to the center of the model. Emotions that oppose each other are similarly depicted in the illustration. For example, the emotions of serenity, joy and ecstasy oppose grief, sadness, and pensiveness. Furthermore, more intense emotions, such as, but not limited to, loathing, rage, and terror may be located in an inner circle of emotions and less intense emotions may be located outside of the inner circle. Therefore, one scale of emotions may include (in order), grief, sadness 506, pensiveness 508, serenity 502, joy 504, and ecstasy.

In one example, a happiness range includes grief (−3), sadness (−2), pensiveness (−1), serenity (1), joy (2), ecstasy (3). A similar range of an emotion includes loathing (−3), disgust (−2), boredom (−1), acceptance (1), trust (2), admiration (3). In another example, an emotional range is vigilance (−3), anticipation (−2), interest (−1), distraction (1), surprise (2), amazement (3). Of course, other emotions and/or ranges of emotion may be defined and used by the mood module 260 to determine a numeric value for an emotional indicator.

In another example, the emotions of sadness and happiness both include positive values and the mood module 260 determines a mood level by summing the happiness values and subtracting a sum of the sadness values. If the resulting value is above 0, then the aggregate emotion is happiness. If the resulting value is below 0, then the aggregate emotion is sadness. A mood level for the aggregate emotion is the difference between the sum of the happiness values and the sum of the sadness values.

In another example, the mood module 260 may determine some emotions on a happiness scale and other emotions on a fear scale. In this example, because the emotions of happiness and fear do not directly oppose each other, the mood module 260 aggregates the emotions on the happiness scale and the emotions on the fear scale. The mood module 260 then compares the two sums and determines that the aggregate emotion is the emotion with the highest sum.

Figure 6:
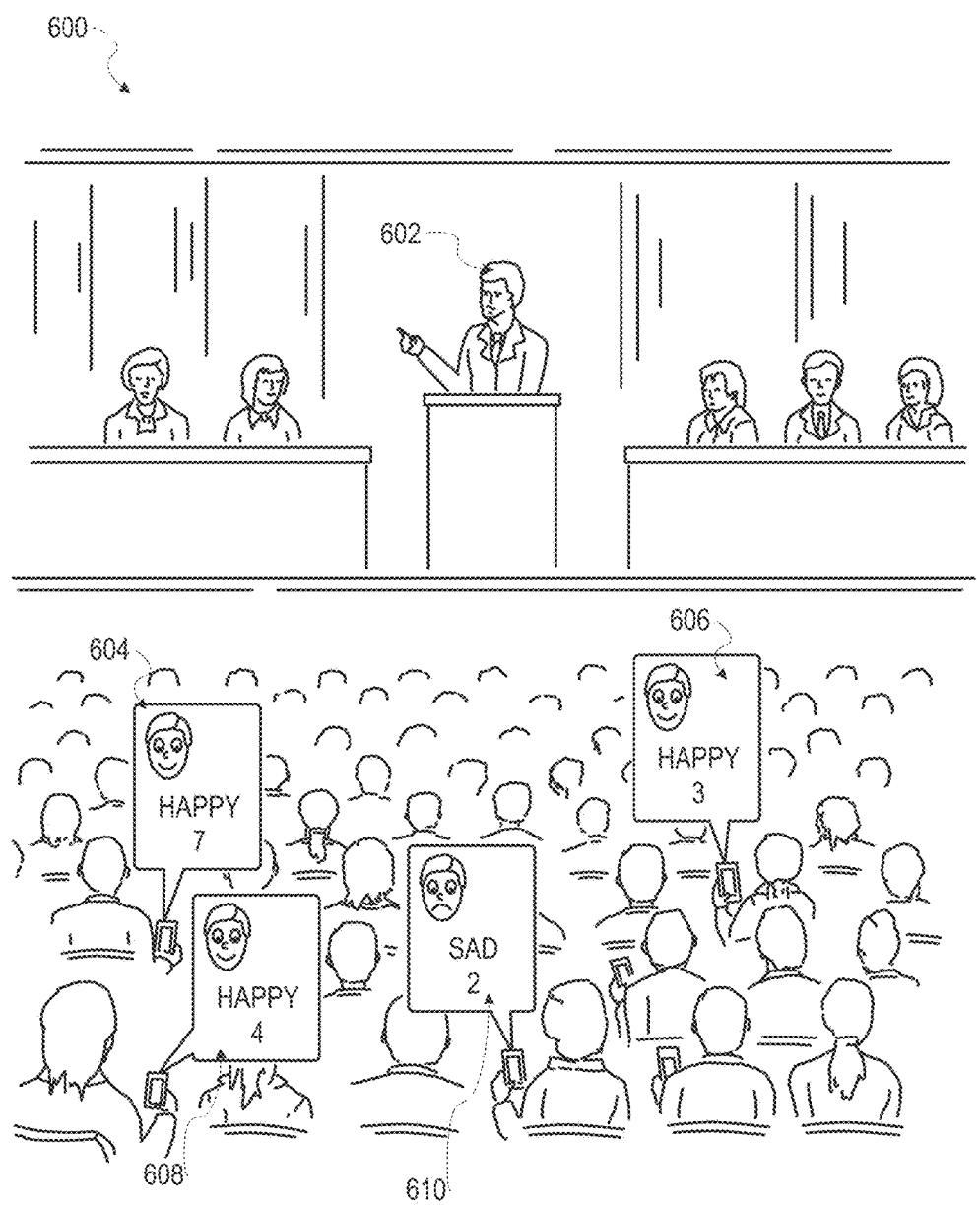
FIG. 6 is a diagram illustrating an example of determining a mood for a group of attendees at an event, according to some example embodiments.

FIG. 6 is a diagram illustrating an example of determining a mood for a group of attendees at an event, according to some example embodiments. In this specific example, attendees are attending a speech and many attendees have a client device 110.

In this example, the attendees want to share the experience with contacts (e.g., friends or followers) on the social messaging system 130. The attendee captures an image or video (e.g., via an image sensor of the client device) and composes a message using a social messaging application executing on the client device 110 (e.g., SNAPCHAT®). The social messaging system 130 receives the current geo-location of the client device 110. Furthermore, in this example, the client device is configured to determine a mood level based on the pictograph. The client device 110 then transmits a description of the determined mood level to the indicator module 240. The indicator module 240 then converts the textual description of the mood to a mood level.

In one example, one attendee transmits a social message 604 to the social messaging system 130. The message 604 includes a textual description (Happy, level 7) describing a mood for the attendee. Another message 606 indicates Happiness level 3. Another message 608 indicates happiness level 4. A last message 610 indicates sadness level 2.

The mood module 260 determines a mood level based on the textual description and aggregates sentiment for the attendees that sent messages to the social messaging system. The mood module 260 infers a mood for the group of attendees based on the received messages 604, 606, 608, and 610.

Figure 7:
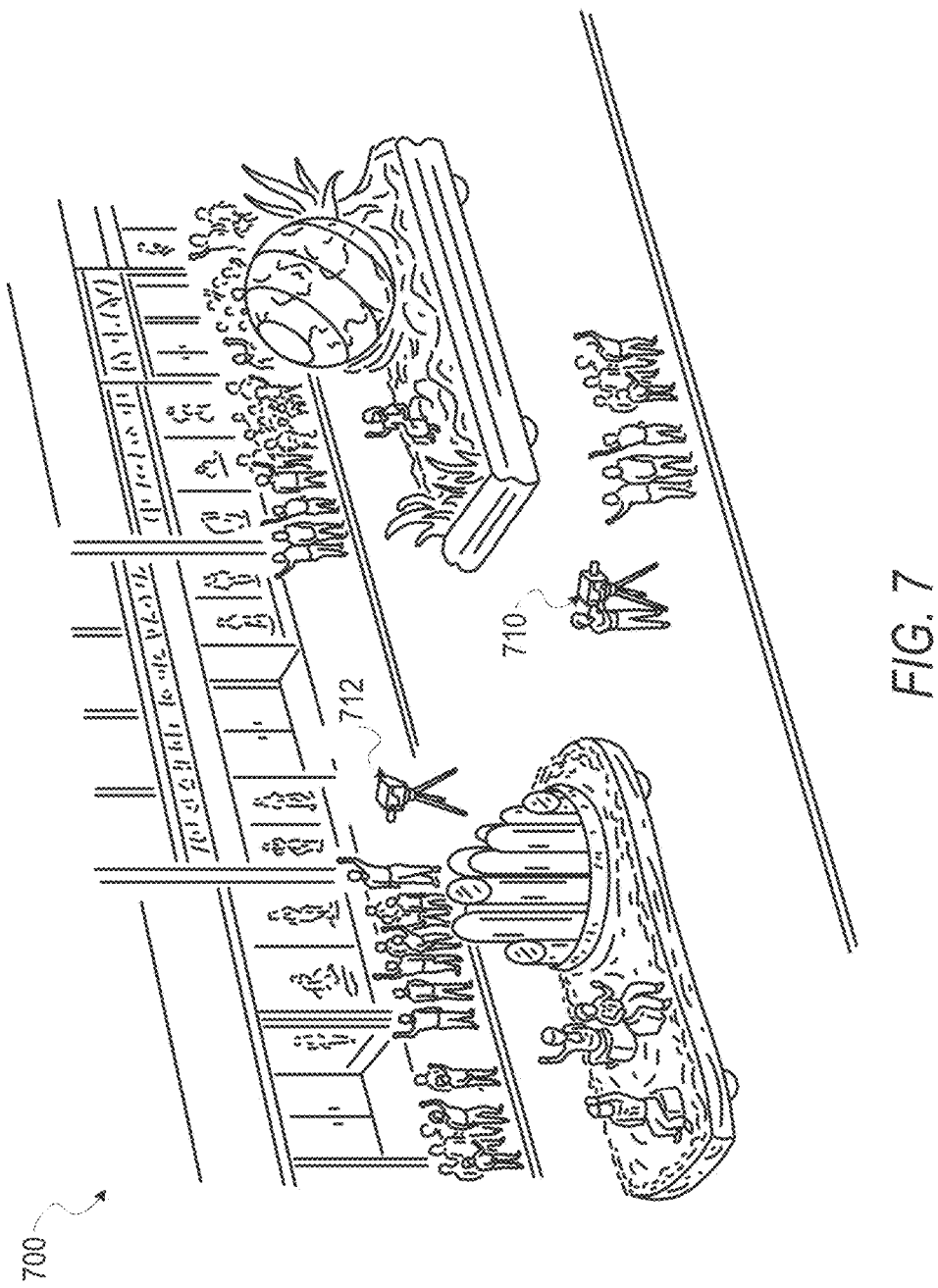
FIG. 7 is a diagram illustrating an example of determining a mood for a group of attendees at an event, according to some example embodiments.

FIG. 7 is a diagram illustrating an example 700 of determining a mood for a group of attendees at an event, according to some example embodiments. In this example, one or more video cameras 710,712 record attendees at a parade.

The video cameras 710,712 operate as a client device 110 and capture imagery of the attendees at the event. In one embodiment, camera 712 transmits periodic imagery to the event module 220. In one example, the camera 710 transmits a single image of the attendees every 10 seconds. Of course, other periods may be used and this disclosure is not limited in this regard. In another example, the camera 712 streams the video to the event module 220 and the event module 220 parses the video into independent images to be indicators indicating emotions of the attendees.

The event module 220 receives the periodic imagery. Because the imagery includes faces of the attendees, the imagery indicates emotions of the attendees. The indicator module 240 processes the imagery received from the cameras 710,712 to determine a numerical value for each of the faces in the images. In another embodiment, the event module 220 concurrently receives imagery from both cameras 710,712. The imagery from the two cameras 710,712 may be received at different periods, or may be streamed as previously described.

In one embodiment, the mood module 260 determines a numerical value for each of the indicators, where the numerical value indicates an emotional intensity of the attendees of the event. The mood module 260 then aggregates the numerical values to determine an aggregate sentiment of the attendees of the event.

In another embodiment, the mood module 260 records the aggregate sentiment over a period of time. For example, in response to receiving each indicator, the mood module 260 adds the resulting aggregate sentiment to an array of values. In a further embodiment, the graphic module 280 plots the array of values. In one embodiment, the mood module 260 notifies a host for the event regarding the mood of the crowd of attendees. In another example, the mood module 260 requests compensation for providing the array of values to a host, promoter, or other entity managing the event.

FIG. 8 is a chart 800 illustrating one example of a mood of a group of people over time, according to one example embodiment. In this example, the graphic module 280 generates a plot 800 of the array of values. The plot 800 depicts a happiness level for the group of attendees over a period of time.

The period of time may be based on a start time and an end time for the event. In another example, the period of time is a period of time when messages being received from attendees of the event remain above a threshold number of messages per unit time. For example, for each hour the social messaging system 130 receives 100 or more messages from attendees of the event, the mood module 260 continues to track the mood level for the group of attendees as described herein.

FIG. 9 is a chart 900 depicting various emotions for a group of people according to one example embodiment. In this example, the aggregate sentiment for the group of attendees is 72%. The graphic module 280 generates the chart 900 that includes one scale presenting the aggregate sentiment 902. Furthermore, the graphic module 280 generates an array 904 of charts depicting independent bars for each of the mood scales. In this example, the mood scales include a sad/happy scale, a bored/excited scale, and a disinterested/engaged scale. The graphic module 280 may plot different scales according to an emotional model, including, but not limited to the model depicted in FIG. 5.

In another example, the chart 900 may be presented real-time. In this example, the graphic module 280 updates the chart each time new indicators are received. The mood detection system 160 may provide a user interface to a remote client to present the chart 900.

FIG. 10 is a set of charts 1000 illustrating one example of emotions for different groups of people according to one example embodiment. In this example, various charts 1000 depict an aggregate mood level for different demographical groups.

In this example, the indicator module 240 separates the indicators according to demographical information. For example, the attendee that transmits a social message to the social messaging system 130 via a client device 110 may have a profile at the social messaging system 130. Therefore, in one example, the indicator module 240 can determine demographical information in the profile for the attendee.

The graphic module 280 further generates distinct graphical charts 1000 for each of the demographical groups. Some attendees may be members of more than one group. For example, an individual in demographic group 2 may also be in demographic group 5.

Figure 11:
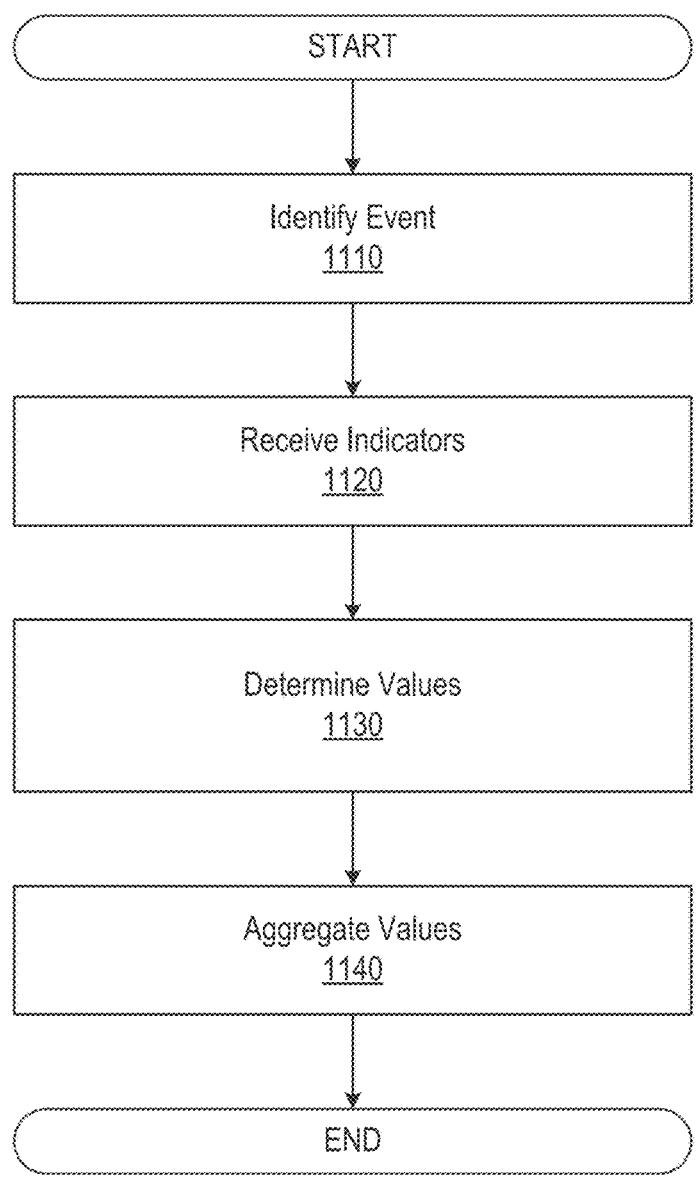
FIG. 11 is a flow diagram illustrating an example method for determining a mood for a group, according to some example embodiments.

FIG. 11 is a flow diagram illustrating an example method 1100 for determining a mood for a group, according to some example embodiments. The operations of the method 1100 may be performed by components of the mood detection system 160, and are so described below for the purposes of illustration.

The method 1100 begins and at operation 1110, the event module 220 identifies an event that includes two or more attendees. The method 1100 continues at operation 1120 and the indicator module 240 receives at least one indicator representing emotions of attendees. The indicators may be an image of a face of an attendee or a description of an emotion of an attendee.

The method 1100 continues at operation 1130 and the mood module 260 determines a numerical value for each of the indicators. The numerical value indicates an emotional intensity of the attendee at the event. The method continues at operation 1140 and the mood module 260 aggregates the numerical values to determine an aggregate sentiment of the attendees of the event as described herein.

In another embodiment, the indicator module 240 extracts the images of the attendee's faces from a video stream. The video stream may be from a client device 110 with a video capable camera.

Figure 12:
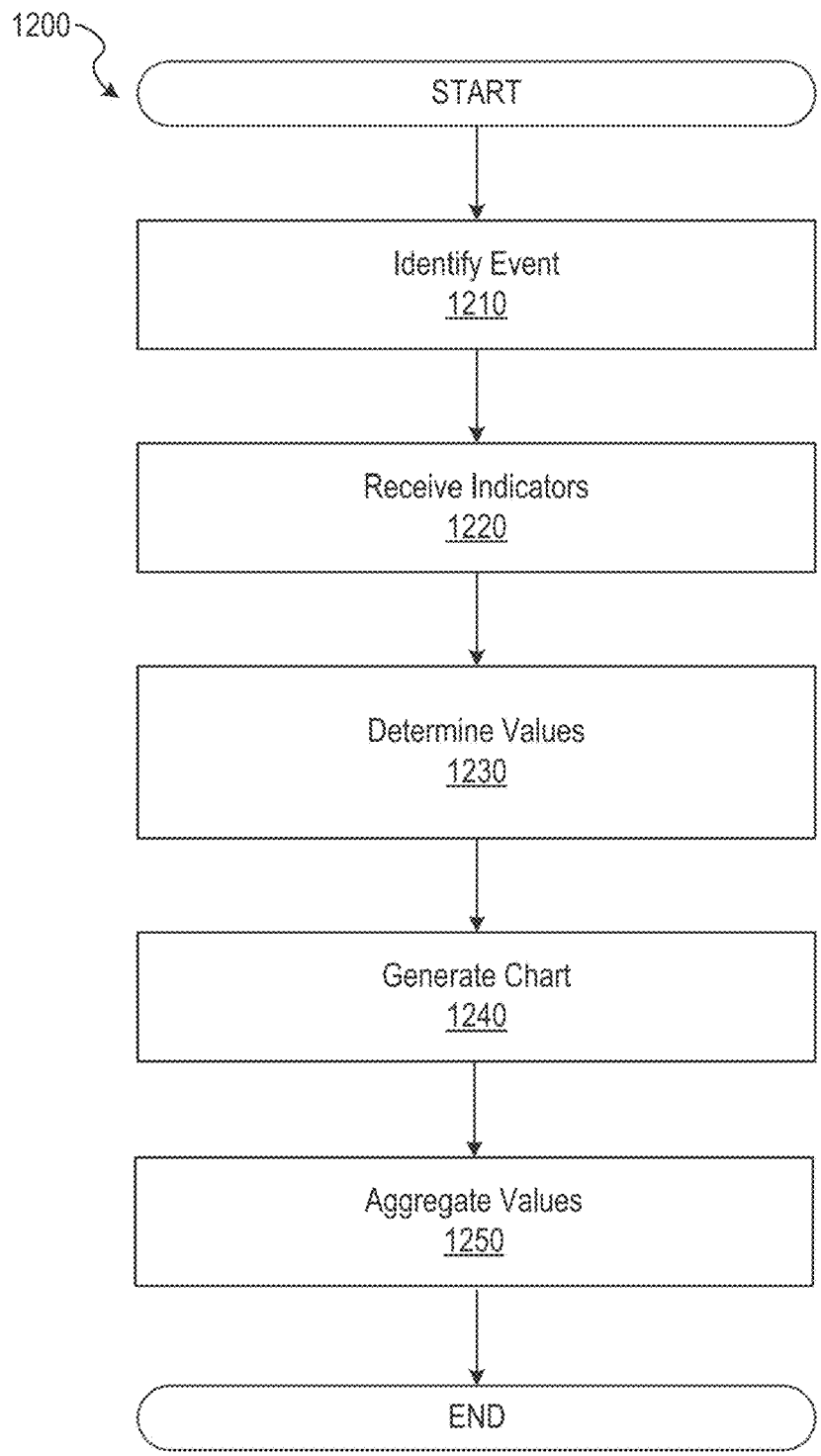
FIG. 12 is a flow diagram illustrating an example method for determining a mood for a group and presenting results, according to some example embodiments.

FIG. 12 is a flow diagram illustrating an example method 1200 for determining a mood for a group, according to some example embodiments. The operations of the method 1200 may be performed by components of the mood detection system 160, and are so described below for the purposes of illustration.

The method 1200 begins and at operation 1210, the event module 220 identifies an event that includes two or more attendees. The method 1200 continues at operation 1220 and the indicator module 240 receives many indicators representing emotions of attendees. The indicators may be an image of a face of an attendee or a textual description of an emotion of an attendee.

The method 1200 continues at operation 1230 and the mood module 260 determines a numerical value for each of the indicators. The numerical value indicates an emotional intensity of the attendee at the event. The method 1200 continues at operation 1240 and the graphic module 280 generates a chart depicting the numerical values of the indicators. The chart may be a wide variety of different pictorial representations of the numerical values and this disclosure is not limited in this regard. The mood module 260 then, at operation 1250, aggregates the numerical values to determine an aggregate sentiment of the attendees of the event as described herein.

Figure 13:
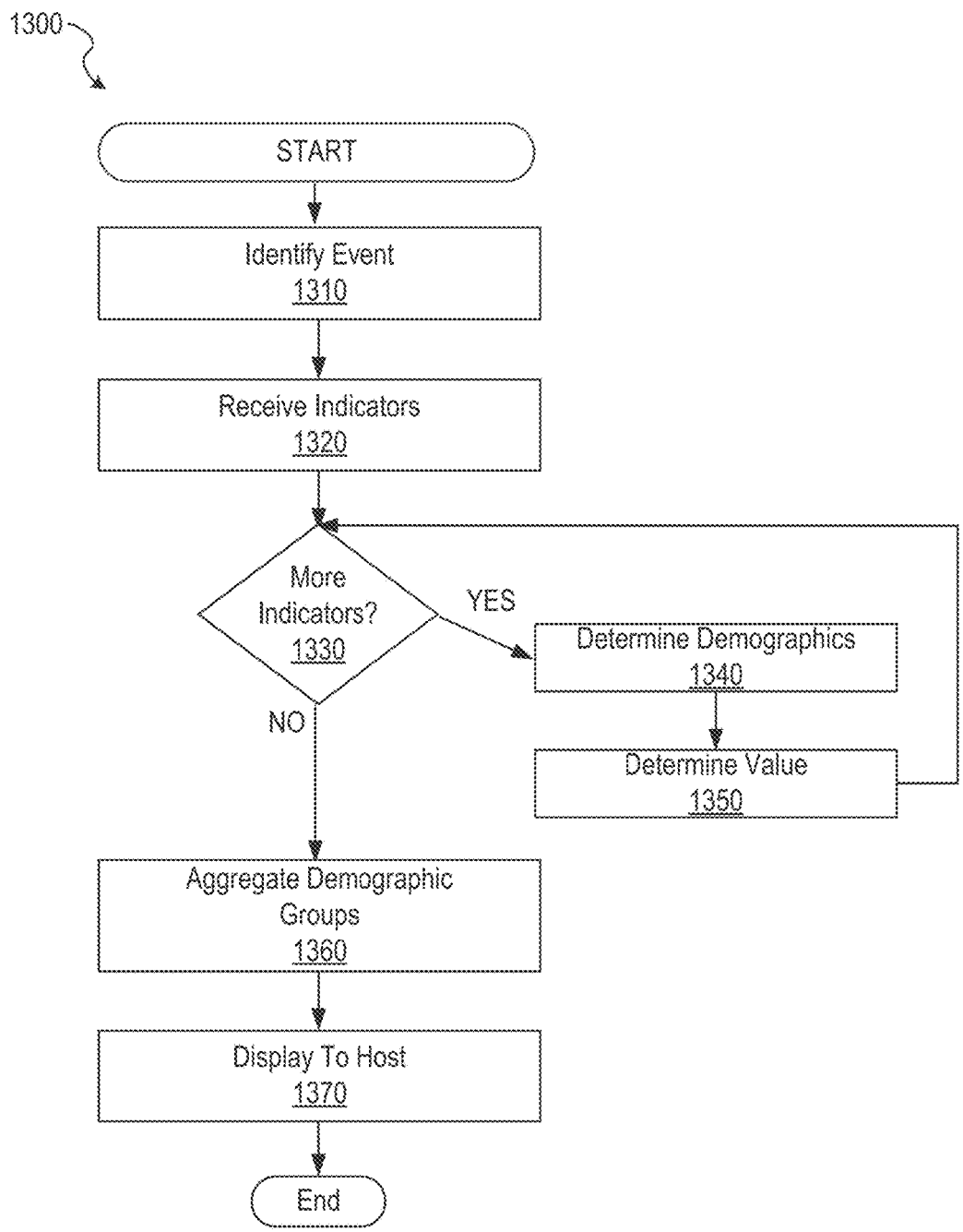
FIG. 13 is a flow diagram illustrating an example method for determining a mood for a demographical group, according to some example embodiments.

FIG. 13 is a flow diagram illustrating an example method 1300 for determining a mood for a group, according to some example embodiments. The operations of the method 1300 may be performed by components of the mood detection system 160, and are so described below for the purposes of illustration.

The method 1300 begins at operation 1310, the event module 220 identifies an event that includes two or more attendees. The method 1300 continues at operation 1220 and the indicator module 240 receives a set of indicators representing emotions of attendees. The method 1300 continues at operation 1330 and the indicator module 240 determines whether more indicators need to be analyzed. For each indicator, the method continues at operation 1340 and the indicator module 240 determines demographical properties for the indicator. Determining demographical properties may be based on the image of the face of the attendee or on profile information for the attendee at the social messaging system 130. The method continues at operation 1350 and the mood module 260 determines a numerical value for each of the indicators as previously described.

After processing the various indicators, the method 1300 continues at operation 1360 and the mood module 260 aggregates the numerical values into each determined demographical group. The method 1300 continues at operation 1370 and the graphic module 280 displays the demographical information via a display accessible by a host for the event.

Figure 14:
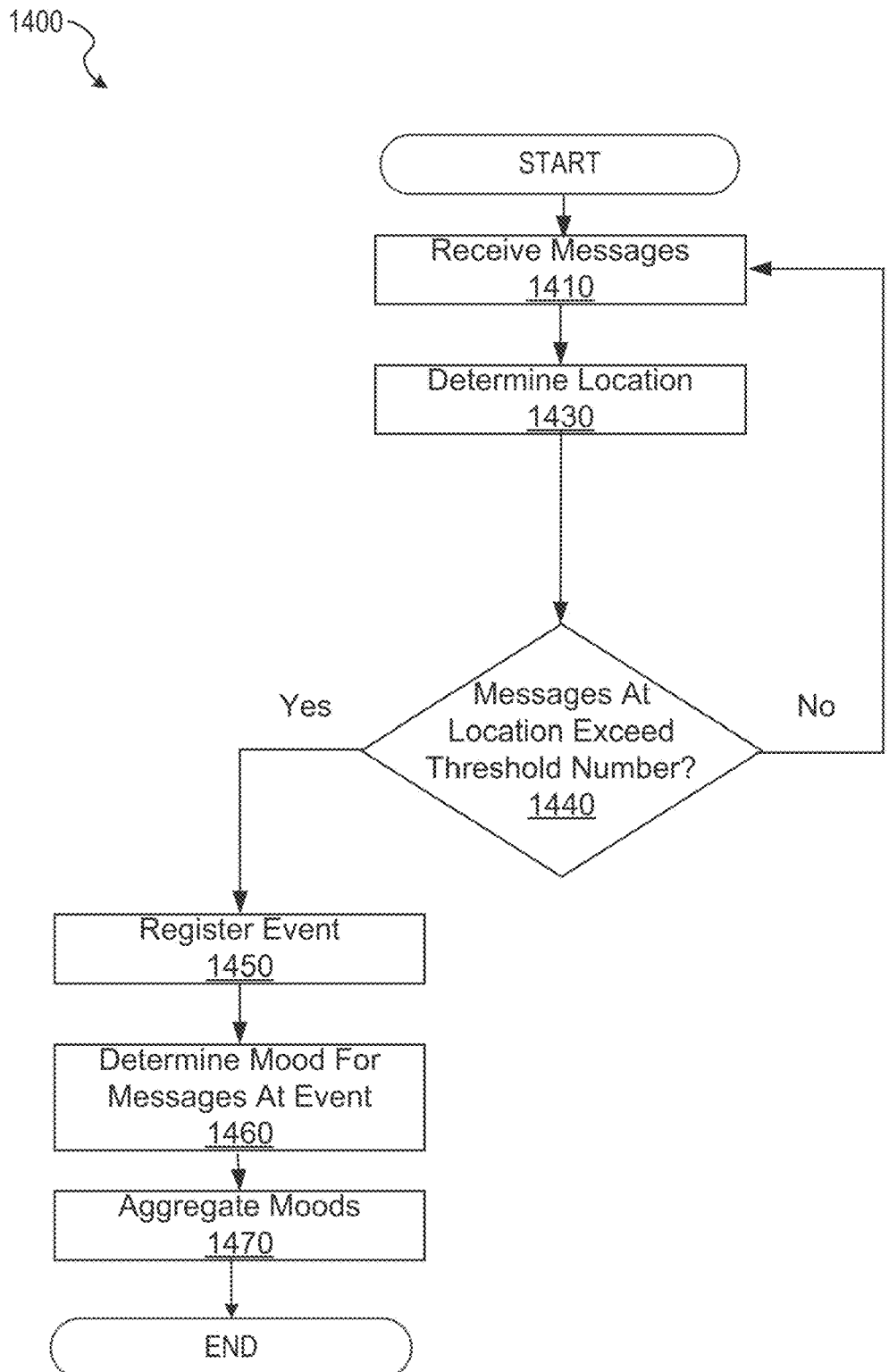
FIG. 14 is a flow diagram illustrating an example method for determining an event, according to some example embodiments.

FIG. 14 is a flow diagram illustrating an example method 1400 for determining a mood for a group, according to some example embodiments. The operations of the method 1400 may be performed by components of the mood detection system 160, and are so described below for the purposes of illustration.

The method 1400 begins at operation 1410, where the event module receives one or more messages from client devices 110 for the social messaging system 130. Although the message is destined for other client devices 110, the event module 220 inspects the messages. The method 1400 continues at operation 1430 and the event module 220 determines respective locations for each social message.

The method continues at operation 1440, where in response to not receiving a threshold number of messages, the method continues at operation 1410 and the event module 220 receives additional messages. In response to receiving a threshold number of messages originating from a similar location, the method continues at operation 1450 and the event module 220 registers an event at the location. The method 1400 continues at operation 1460 and the mood module 260 determines a numerical value representing a mood for each received message. The method 1400 continues at operation 1470 and the mood module 260 aggregates numerical values for the mood levels as described herein.

In one example, the threshold number of messages from a common event is 1000 messages. In response to receiving 1000 or more messages from client devices 110 at a specific location, the event module 220 determines that an event is occurring at the location and begins tracking emotions for the attendees of the event based on the received social messages.

Figure 15:
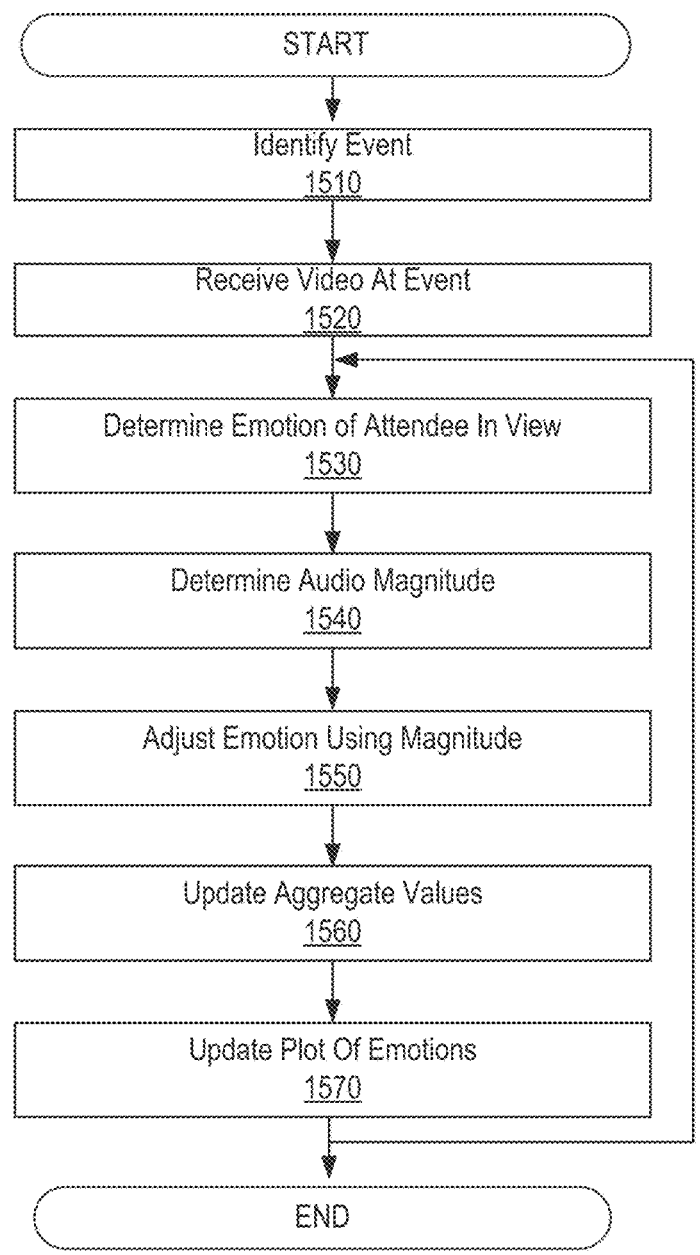
FIG. 15 is a flow diagram illustrating an example method for determining a mood for a group, according to some example embodiments

FIG. 15 is a flow diagram illustrating an example method 1500 for determining a mood for a group, according to some example embodiments. The operations of the method 1500 may be performed by components of the mood detection system 160, and are so described below for the purposes of illustration.

The method 1500 begins at operation 1510, where the event module 220 identifies an event based on receiving a request to monitor the event. The method 1500 continues at operation 1520 and the event module 220 receives a video from the event. The video may be a real-time feed or may be transmitted after the event occurred. The indicator module 240 extracts specific frames from the video, wherein the specific frames are indicators of emotions of the attendees in the video. The indicator module 240 determines whether one or more faces are included in each frame and determines whether the frame is an indicator or not. In response to the frame not including any faces, the indicator module 240 discards the frame. In response to the frame including an image of an attendee for the event, the indicator module 240 determines that the frame is an indicator.

The method continues at operation 1530 and the mood module 260 determines an emotion for the attendee in each frame. The method 1500 continues at operation 1540 and the mood module 260 determines a magnitude for the audio signal corresponding to the frame in the video. The method continues at operation 1550 and the mood module 260 adjusts the mood level based on the magnitude of the audio signal. For example, where the magnitude of the audio signal is twice that of an average magnitude for the video, the mood module 260 doubles the intensity of the mood level. In another example, if the magnitude of the audio is 60% of an average magnitude for the video, the mood module 260 multiples the intensity of the mood level by 0.6. Of course, the mood module 260 may use other multipliers and this disclosure is not limited in this regard.

The method 1500 continues at operation 1560 and the mood module 260 aggregates the mood levels. The method continues at operation 1570 and the graphic module 280 updates a plot of the mood levels as described herein.

Figure 16:
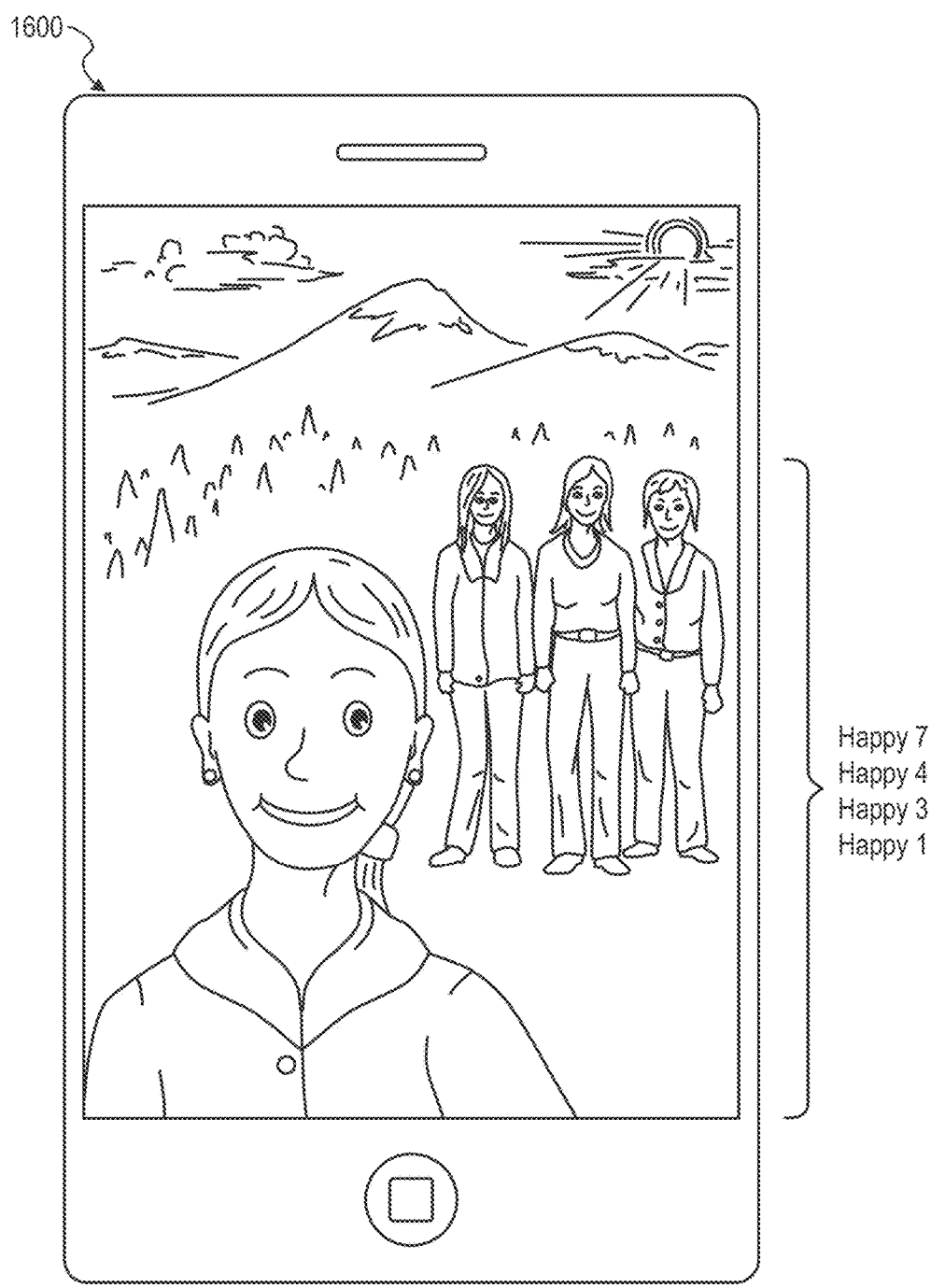
FIG. 16 depicts an example user device (e.g., smart phone) displaying an example user interface, according to some example embodiments.

FIG. 16 depicts an example user device 1600 (e.g., smart phone) displaying an example user interface, according to some example embodiments. Although user interfaces described herein depict specific example user interfaces and user interface elements, these are merely non-limiting examples and many other alternate user interfaces and user interface elements can be generated by the graphic module 280 and presented to the user. It will be noted that alternate presentations of the displays described herein include additional information, graphics, options, and so forth; other presentations include less information, or provide abridged information for easy use by the user.

In various example embodiments, the user interface is an example of a message composition user interface of a social messaging app executing on a mobile device. In an embodiment, the user interface 1600 includes message content comprising an image (still photos/pictures or video) (e.g., captured by a camera sensor of the user device 1600).

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 17:
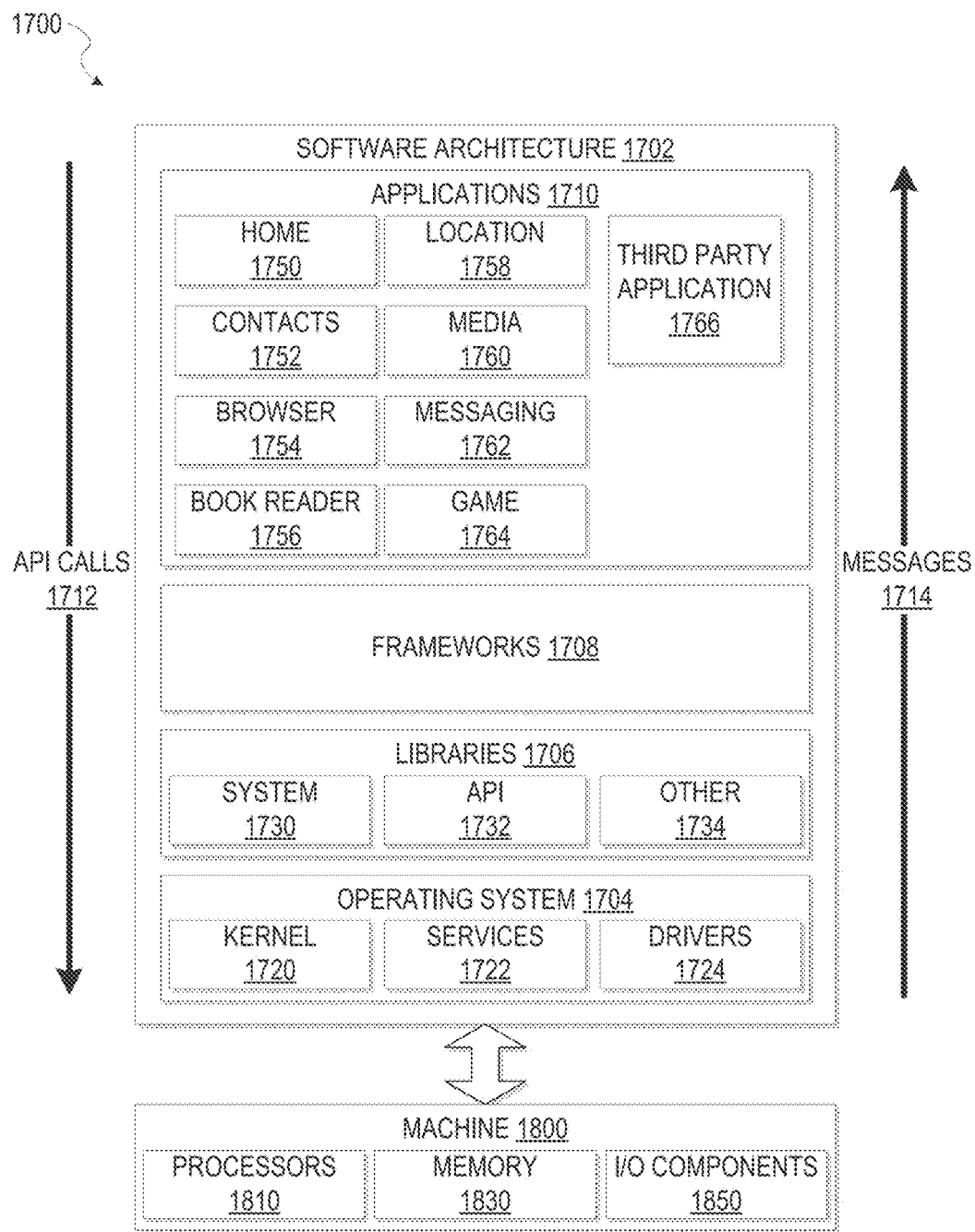
FIG. 17 is a block diagram illustrating an example of a software architecture that may be installed on a machine, according to some example embodiments.

FIG. 17 is a block diagram 1700 illustrating an architecture of software 1702, which can be installed on any one or more of the devices described above. FIG. 17 is merely a non-limiting example of a software architecture, and it will be appreciated that many other architectures can be implemented to facilitate the functionality described herein. In various embodiments, the software 1702 is implemented by hardware such as machine 1800 of FIG. 18 that includes processors 1810, memory 1830, and input/output (I/O) components 1850. In this example architecture, the software 1702 can be conceptualized as a stack of layers where each layer may provide a particular functionality. For example, the software 1702 includes layers such as an operating system 1704, libraries 1706, frameworks 1708, and applications 1710. Operationally, the applications 1710 invoke API calls 1712 through the software stack and receive messages 1714 in response to the API calls 1712, consistent with some embodiments. In one example, the mood detection system 160 operates as an application 1710.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphic user interface (GUI) functions, high-level resource management, high-level location services, and so forth. The frameworks 1708 can provide a broad spectrum of other APIs that can be utilized by the applications 1710, some of which may be specific to a particular operating system or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 1766 can invoke the API calls 1712 provided by the operating system 1704 to facilitate functionality described herein.

Example Machine Architecture and Machine-Readable Medium

Figure 18:
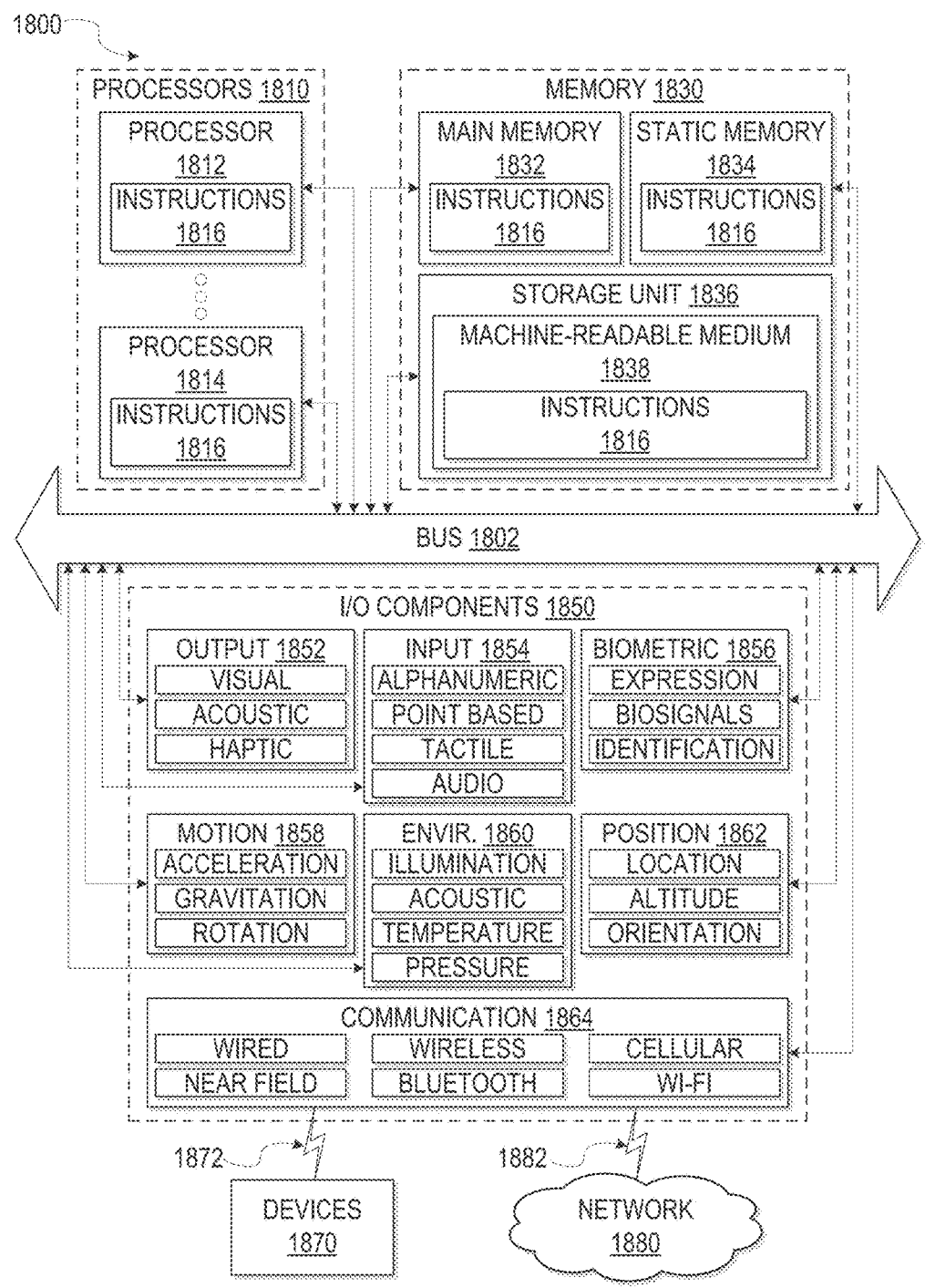
FIG. 18 illustrates a diagrammatic representation of a machine in the form of a computer system within which a set of instructions may be executed for causing the machine to perform any one or more of the methodologies discussed herein, according to an example embodiment.

FIG. 18 is a block diagram illustrating components of a machine 1800, according to some embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein can be executed. In alternative embodiments, the machine 1800 operates as a standalone device or can be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein. In one specific example, the various modules 220,240,260,280 are included in the instructions 1816.

In various embodiments, the machine 1800 comprises processors 1810, memory 1830, and I/O components 1850, which can be configured to communicate with each other via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1812 and a processor 1814 that may execute the instructions 1816. The term "processor" is intended to include multi-core processors that may comprise two or more independent processors (also referred to as "cores") that can execute instructions contemporaneously. Although FIG. 18 shows multiple processors, the machine 1800 may include a single processor with a single core, a single processor with multiple cores (e.g., a multi-core processor), multiple processors with a single core, multiple processors with multiples cores, or any combination thereof.

The memory 1830 comprises a main memory 1832, a static memory 1834, and a storage unit 1836 accessible to the processors 1810 via the bus 1802, according to some embodiments. The storage unit 1836 can include a machine-readable medium 1838 on which are stored the instructions 1816 embodying any one or more of the methodologies or functions described herein. The instructions 1816 can also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various embodiments, the main memory 1832, the static memory 1834, and the processors 1810 are considered machine-readable media 1838.

As used herein, the term "memory" refers to a machine-readable medium 1838 able to store data temporarily or permanently and may be taken to include, but not be limited to, random-access memory (RAM), read-only memory (ROM), buffer memory, flash memory, and cache memory. While the machine-readable medium 1838 is shown in an example embodiment to be a single medium, the term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 can include many other components that are not shown in FIG. 18. The I/O components 1850 are grouped according to functionality merely for simplifying the following discussion, and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 include acceleration sensor components (e.g., accelerometer), gravitation sensor components, rotation sensor components (e.g., gyroscope), and so forth. The environmental components 1860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, communication components 1864 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1870 may be another machine or any of a wide variety of peripheral devices (e.g., a peripheral device coupled via a Universal Serial Bus (USB)).

Moreover, in some embodiments, the communication components 1864 detect identifiers or include components operable to detect identifiers. For example, the communication components 1864 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code. Aztec Code, Data Matrix, Dataglyph. MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1864, such as location via Internet Protocol (IP) geolocation, location via WI-FI® signal triangulation, location via detecting a BLU- ETOOTH® or NFC beacon signal that may indicate a particular location, and so forth.

Transmission Medium

In various example embodiments, one or more portions of the network 1880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 can implement any of a variety of types of data transfer technology, such as Single Carrier Radio Transmission Technology (1xRTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1838 is non-transitory (in other words, not having any transitory signals) in that it does not embody a propagating signal. However, labeling the machine-readable medium 1838 "non-transitory" should not be construed to mean that the medium is incapable of movement; the medium should be considered as being transportable from one physical location to another. Additionally, since the machine-readable medium 1838 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A non-transitory computer readable medium comprising instructions that when executed configure hardware processing circuitry to perform operations comprising:
   receiving, from a plurality of mobile computing devices, over a computer network, a corresponding plurality of messages from respective social network members to a corresponding second plurality of social network members, each message including one or more indicators comprising an image of a face of an attendee of an event;
   determining a numerical value representing an intensity of emotion for each of the images based on a distribution of points on the face of the attendee within the image; and
   causing display of a chart on a mobile computing device of the plurality of mobile computing devices that is based on an aggregation of the numerical values.

2. The non-transitory computer readable medium of claim 1, wherein the chart displays separate indicators for attendees having different demographic characteristics.

3. The non-transitory computer readable medium of claim 1, wherein the operations further comprise aggregating the numerical values to determine an aggregate mood of the attendees of the event, wherein the chart further plots the aggregate mood of the attendees over a period of time.

4. The non-transitory computer readable medium of claim 1, wherein the one or more indicators comprise a video and determining the numerical value is further based on a magnitude of an audio signal included with the video.

5. The non-transitory computer readable medium of claim 1, wherein the operations further comprise receiving additional indicators and updating an aggregate mood based on the additional indicators and displaying an updated chart based on the receiving of the additional indicators.

6. The non-transitory computer readable medium of claim 1, wherein the operations further comprise transmitting an aggregate mood to a device of a host for the event.

7. A method comprising:
receiving, from a plurality of mobile computing devices, over a computer network, a corresponding plurality of messages from respective social network members to a corresponding second plurality of social network members, each message including one or more indicators comprising an image of a face of an attendee of an event;
determining a numerical value representing an intensity of emotion for each of the images based on a distribution of points on the face of the attendee within the image; and
displaying a chart that is based on an aggregation of the numerical values.

8. The method of claim 7, wherein the chart displays separate indicators for attendees having different demographical characteristics.

9. The method of claim 7, further comprising aggregating the numerical values to determine an aggregate mood of the attendees of the event, wherein the chart further plots the aggregate mood of the attendees over a period of time.

10. The method of claim 7, wherein the one or more indicators comprise a video and determining a numerical values is further based on a magnitude of an audio signal included with the video.

11. The method of claim 7, further comprising receiving additional indicators and updating an aggregate mood based on the additional indicators and displaying an updated chart based on the receiving of the additional indicators.

12. A system comprising:
hardware processing circuitry;
a hardware memory storing instructions that when executed configure the hardware processing circuitry to perform operations comprising:
identifying an event based on receiving a threshold number of messages from different client devices of attendees of the event, the event including two or more attendees;
receiving at least one indicator representing a mood of the attendees from one or more of the different client devices, the indicator comprising an image of a face of an attendee;
determining a numerical value representing an intensity of emotion for each of the images based on a distribution of points on the face of the attendee within the image
generating a graphical representation based on the numerical values.

13. The system of claim 12, wherein the graphical representation includes separate indicators based on different demographical attributes of the attendees.

14. The system of claim 12, wherein the graphical representation further plots an aggregate mood of the attendees over a period of time based on the numerical values.

15. The system of claim 12, wherein the one or more indicators comprises a video and the operations further comprise determining the numerical values based on a magnitude of an audio signal included with the video.

16. The system of claim 12, wherein the indicators are extracted from the messages received from the different client devices of the attendees, and the images were captured by a respective camera operating as part of each attendee's mobile computing device.

17. The system of claim 12, the operations further comprising aggregating the numerical values to determine an aggregate mood of the attendees of the event, wherein the graphical representation is further displayed to indicate the aggregate mood level.

18. The system of claim 17, the operations further comprising presenting the aggregate mood on a user interface viewable by a host for the event.

19. The system of claim 12, the operations further comprising receiving a message from the computer network, the message requesting to monitor attendee sentiment at the event.

20. The system of claim 12, wherein each image is captured by a camera operating as part of an attendee's mobile computing device.

* * * * *